United States Patent
Cho et al.

[19]

[11] Patent Number: 6,022,398
[45] Date of Patent: Feb. 8, 2000

[54] ADSORPTION SEPARATION AND PURIFICATION APPARATUS AND PROCESS FOR HIGH PURITY ISOBUTANE PRODUCTION

[75] Inventors: Soon-Haeng Cho, Daejeon-Si; Sang-Sup Han, Seoul; Jong-Nam Kim; Kuck-Tack Chue, both of Daejeon-Si; Jung-Il Yang, Seoul; Hee-Tae Beum, Gwanju, all of Rep. of Korea

[73] Assignee: Korea Institute of Energy Research, Daejeon-Si, Rep. of Korea

[21] Appl. No.: 09/034,023

[22] Filed: Mar. 2, 1998

[30] Foreign Application Priority Data

Dec. 31, 1997 [KR] Rep. of Korea ............. 97-80693

[51] Int. Cl.⁷ .................................................. B01D 53/053
[52] U.S. Cl. ........................ 95/98; 95/105; 95/144; 96/130; 96/132; 96/144
[58] Field of Search ............. 95/96–98, 100–105, 95/143–145; 96/130–132, 144; 208/310 R, 310 Z

[56] References Cited

U.S. PATENT DOCUMENTS

| | | | |
|---|---|---|---|
| 2,978,407 | 4/1961 | Tuttle et al. | 95/143 X |
| 2,987,471 | 6/1961 | Eggertsen | 95/143 X |
| 3,078,636 | 2/1963 | Milton | 95/144 |
| 3,078,645 | 2/1963 | Milton | 95/143 |
| 4,386,945 | 6/1983 | Gardner | 95/98 |
| 4,608,061 | 8/1986 | Volles et al. | 95/143 X |
| 4,769,047 | 9/1988 | Dye | 95/143 X |
| 4,880,443 | 11/1989 | Miller et al. | 96/130 X |
| 4,959,083 | 9/1990 | Garrett | 96/130 X |
| 4,982,048 | 1/1991 | Stem et al. | 208/310 Z X |
| 4,982,052 | 1/1991 | Nolte | 208/310 Z X |
| 5,039,651 | 8/1991 | Kosaka et al. | 95/143 X |
| 5,445,742 | 8/1995 | Bothe Almquist et al. | 95/143 X |
| 5,453,113 | 9/1995 | Zarchy et al. | 95/105 X |
| 5,507,857 | 4/1996 | Kumar et al. | 95/143 X |
| 5,658,372 | 8/1997 | Gadkaree | 95/144 X |
| 5,769,928 | 6/1998 | Leavitt | 95/145 X |
| 5,863,315 | 1/1999 | Jullian et al. | 95/143 X |

*Primary Examiner*—Robert Spitzer
*Attorney, Agent, or Firm*—Nikaido Marmelstein Murray & Oram LLP

[57] ABSTRACT

A high purity isobutane adsorption separation and purification apparatus is provided including a pressure regulator which regulates the pressure of an isobutane-containing gas; the at least one adsorption bed packed with zeolite 5A and carbon molecular sieve arranged downstream of and operatively associated with the pressure regulator; a flow control valve disposed between the pressure regulator and the at least one adsorption bed; a surge tank operatively associated with and for receiving a purified isobutane product from the at least one adsorption bed; a vacuum pump operatively associated with and for removal of impurities from the at least one adsorption bed; and valves disposed between the pressure regulator and the at least one adsorption bed, between the at least one adsorption bed and the surge tank, and between the at least one adsorption bed and the vacuum pump. An adsorptive separation and isobutane purification process is also provided which may be used with the apparatus of the invention.

6 Claims, 4 Drawing Sheets

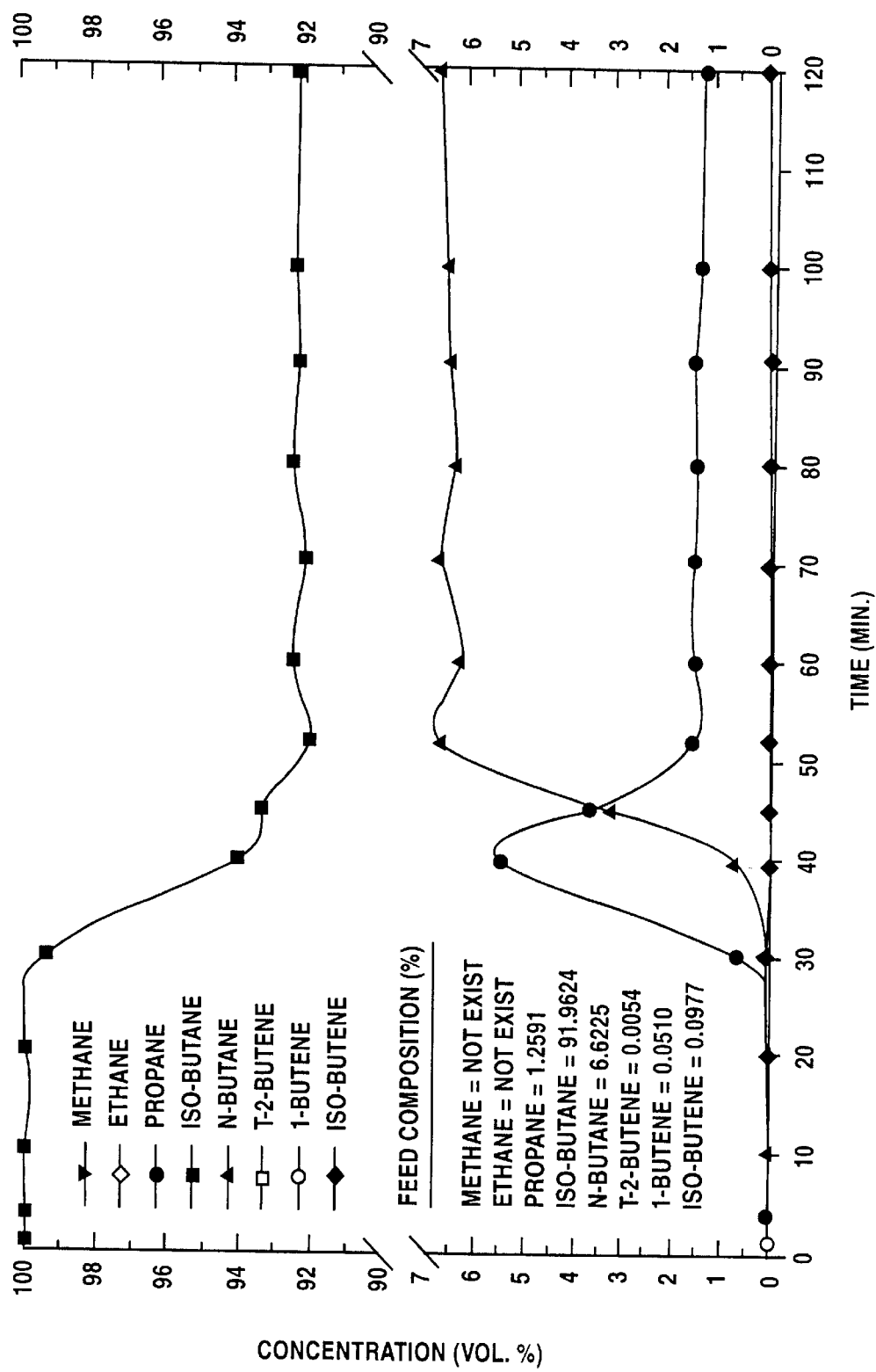

ADSORPTION SEPARATION AND PURIFICATION APPARATUS AND PROCESS FOR HIGH PURITY ISOBUTANE PRODUCTION

BRIEF DESCRIPTION OF THE DRAWINGS

The following drawings are illustrative of embodiments of the invention and are not intended to limit the invention as encompassed by the claims.

FIG. 4 is a diagram for breakthrough compositions of the mixture containing isobutane through the bed packed with zeolite 5A and carbon molecular sieve.

Figure 1:
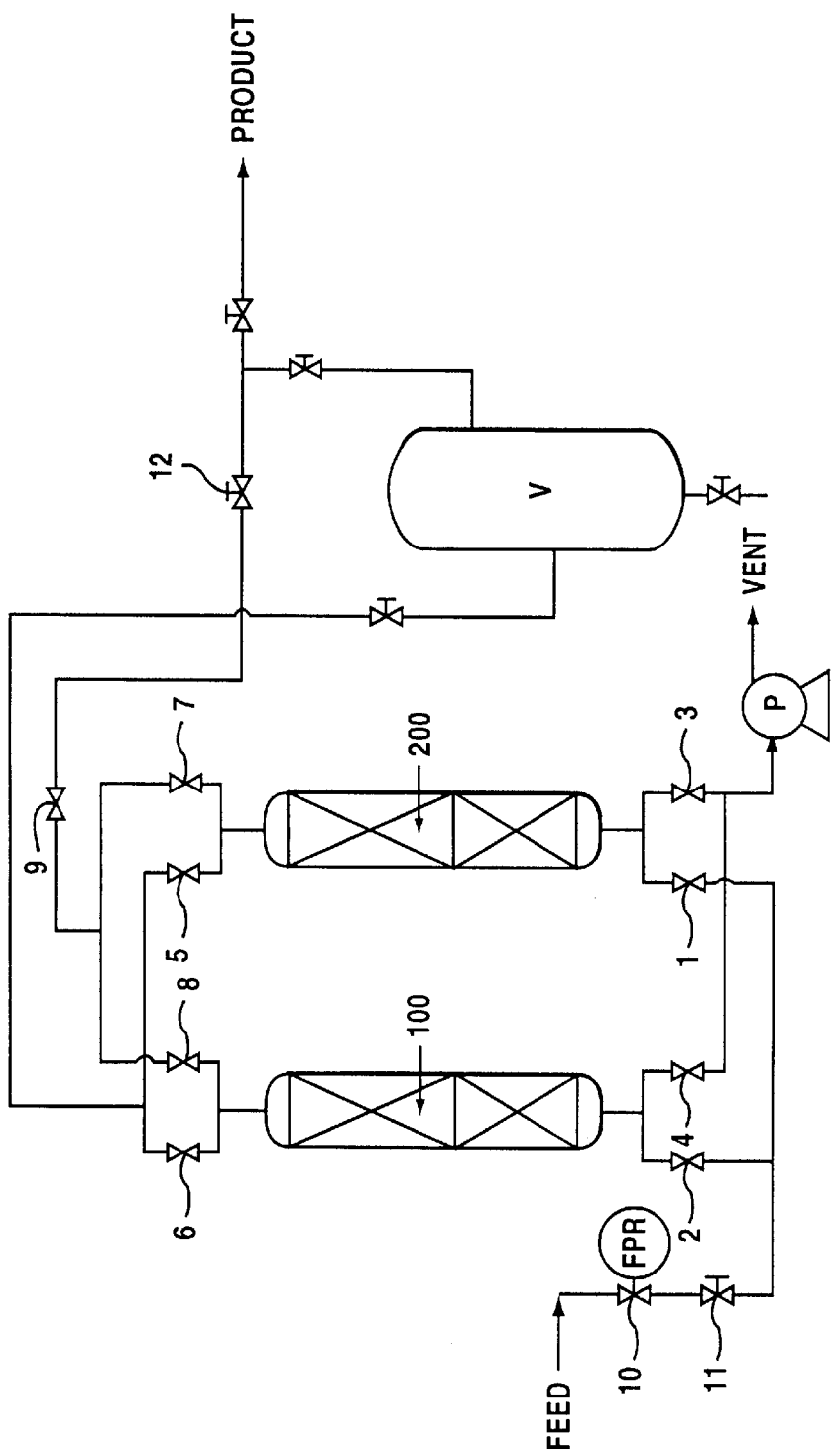
FIG. 1 is a schematic process diagram for high purity isobutane separation and purification.

Legend for Main Parts in the Figures (1~9): valves
(10): pressure regulator
(11~12): flow rate regulation valve
(100): The first adsorption bed (P) : vacuum pump
(200): The second adsorption bed (V) : surge tank

DETAILED DESCRIPTION OF THE INVENTION

OBJECTIVES OF THE INVENTION

TECHNICAL FIELD AND THE PRIOR ART

The present invention relates to adsorption separation and purification apparatus and a process for the production of high purity isobutane. In order to produce high purity isobutane, impurities such as methane, ethane, propane, normal butane, isobutene, 1-butene, and 2-butene are removed from the mixture containing isobutane in adsorption layers formed with zeolite 5A and carbon molecular sieve.

Isobutane is used as a solvent in an ethylene polymerization process, as an aerosol foaming agent, as a polystyrene foaming agent, and in the production of alkylate used to enhance octane number. A large amount of isobutane is contained in LPG, and also naphtha cracked gas contains $C_4$ components. Normally, $C_1$, $C_2$, $C_3$ and $C_4$ paraffins and olefins such as 1-butene, 2-butene, and isobutene are present in mixtures containing isobutane. These mixtures are composed of close boiling constituents and the relative volatilities of constituting components are almost the same. Therefore separation and purification of high purity isobutane from the mixture using general distillation is almost impossible.

One of the methods used to produce high purity isobutane is that olefins in the mixture are hydrogenated with catalytic reaction, by which olefins are converted to the paraffins, and, then, an isobutane/normal butane stream is separated using distillation. The concentrated isobutane is passed through a filter to remove impurities and the product is again passed through a dryer. In this method, very high capital and operation costs are incurred.

Adsorption processes to produce isobutane shown in previous patents and in published literature are limited to mixtures containing only 2 or 3 components and the separation mechanism is based on linear/branched characteristics of the constituting components. There is no process to separate and purify only one component, i.e., isobutane, from mixtures containing more than 5 components of paraffins and olefins.

In U.S. Pat. No. (4,608,061), a process to concentrate isobutane to 95% from a gas mixture of normal butane and isobutane is described. However, in the patent, the production of higher purity isobutane and any method of removing olefins such as 1-butene, 2-butene and isobutene are not mentioned and even the removal of the impurities seems to be impossible in such a process.

TECHNICAL IMPROVEMENT IN THE PRESENT INVENTION

The present invention is completed by overcoming these problems and the objectives of the invention are to provide adsorption separation and purification apparatus and a process for obtaining high purity isobutane by removing paraffins such as methane, ethane, propane, normal butane and olefins such as isobutene, 1-butene, 2-butene from light hydrocarbon mixtures containing isobutane with zeolite 5A and carbon molecular sieve adsorbents.

The present invention provides high purity isobutane production apparatus and it comprises a pressure regulator which regulates feed gas pressure; a plurality of adsorption beds packed with zeolite 5A and carbon molecular sieve through which the mixed gas, flows passed through the pressure regulator, a flow rate control valve between the pressure regulator and the adsorption beds; a surge tank through which isobutane flows from the adsorption beds, where impurities are removed; a vacuum pump for removal of any impurities from the adsorption beds; valves arranged between the adsorption beds, between the pressure regulator and the adsorption beds, between the adsorption beds and the tank, and between the adsorption beds and the vacuum pump.

ORGANIZATION AND CONFIGURATION OF THE INVENTION

FIG. 1 is a diagram of high purity isobutane separation and purification apparatus. The apparatus includes first and second adsorption beds(100,200) packed with zeolite 5A and carbon molecular sieve, a vacuum pump to regenerate the adsorption beds, a surge tank(V) to which isobutane, purified in the adsorption beds, flows and from which part of isobutane product is sent to the adsorption beds as pressurization gas, and several valves(1~9) positioned between the adsorption beds, the vacuum pump, and the tank. The process includes an adsorption step where gas mixture is supplied to a number of adsorption beds and the purified isobutane is sent to the tank, a first pressure equalization step where the pressure in one bed which has undergone the adsorption step becomes equal to the pressure in the other bed which has undergone a low pressure purge step, a desorption step where regeneration with a vacuum pump takes place in the bed which has undergone the adsorption step and the first pressure equalization step, a low pressure purge step where part of high purity isobutane product is counter-currently flowed to the bed while the vacuum pump removes any residual impurities in the bulk space of the adsorption bed(200) which has undergone the desorption step, a second pressure equalization step where the pressure in the bed which has just finished the low pressure purge step and that in the other bed which has undergone the adsorption step become equal, and a pressurization step in which part of isobutane product stored in the surge tank is transferred to the adsorption bed which has undergone the low pressure purge step and the second pressure equalization step.

Absorption Step

A gas mixture of isobutane with methane, ethane, propane, normal butane, 1-butene, 2-butene, and isobutene or mixtures including some of these components with isobutane are pressure-regulated with the pressure regulator(10). They are passed through valve 1 and supplied to the second adsorption bed(200) in which regenerative pressurization is completed. At this moment, all components except isobutane are adsorbed on the packed adsorbents(zeolite 5A and carbon molecular sieve) in the second adsorption bed(200) and the raffinate, i.e., the purified isobutane, is sent to the surge tank(V) through the valve 5.

The adsorption step in the second adsorption bed(200) is completed just before the impurities emerge from the second bed(200).

The First Pressure Equalization Step

After the adsorption step is completed, valves 1 and 5 are closed and valves 7 and 8 are open. Remaining isobutane in the second adsorption bed(200) is moved to the first adsorption bed(100) and the pressure in the first adsorption bed and that in the second adsorption bed become equal. That is to say, the pressure in the first adsorption bed(100) increases by the flow of isobutane from the second adsorption bed(200) and it becomes equal to the pressure in the second adsorption bed(200).

Desorption Step

When the first pressure equalization step is completed, valve 7 is closed and valve 5 is open. The second adsorption bed(200) is regenerated by the desorption of already adsorbed impurities with the the operation of the vacuum pump(P)

Low Pressure Purge Step

When the desorption step is finished, valve 9 and valve 7 are open while the vacuum pump(P) is operating. Residual impurities in the bulk space of the adsorption bed(200) are removed through purging of isobutane product. Further regeneration of the adsorbents in the bed is obtained through the low pressure purge.

The Second Pressure Equalization Step

When the low pressure purge step is finished, isobutane remaining in the first adsorption bed(100) is moved and recovered to the second adsorption bed(200) by opening valves 7 and 8. The pressures in the first and second adsorption beds become equal. That is to say, the pressure in the second adsorption bed increases by the isobutane flow from the first adsorption bed and becomes equal to that in the first adsorption bed.

Pressurization Step

When the second pressure equalization step is completed, the second adsorption bed is pressurized with the high purity isobutane in the surge tank by closing valve 8 and opening valves 7 and 9. When the second adsorption bed(200) is pressurized, the feed gas is supplied by opening the valve 1. The repetitive cyclic operation alternates between the first and the second adsorption beds, and high purity isobutane is produced. Also, the third and fourth adsorption beds can be used to prevent the stoppage of gas feeding and product flow during the pressure equalization and the pressurization steps. Also, high purity isobutane can be produced in an adsorptive separation and purification process in which an adsorption bed packed with zeolite 5A and that packed with carbon molecular sieve are arranged in series.

Figure 2:
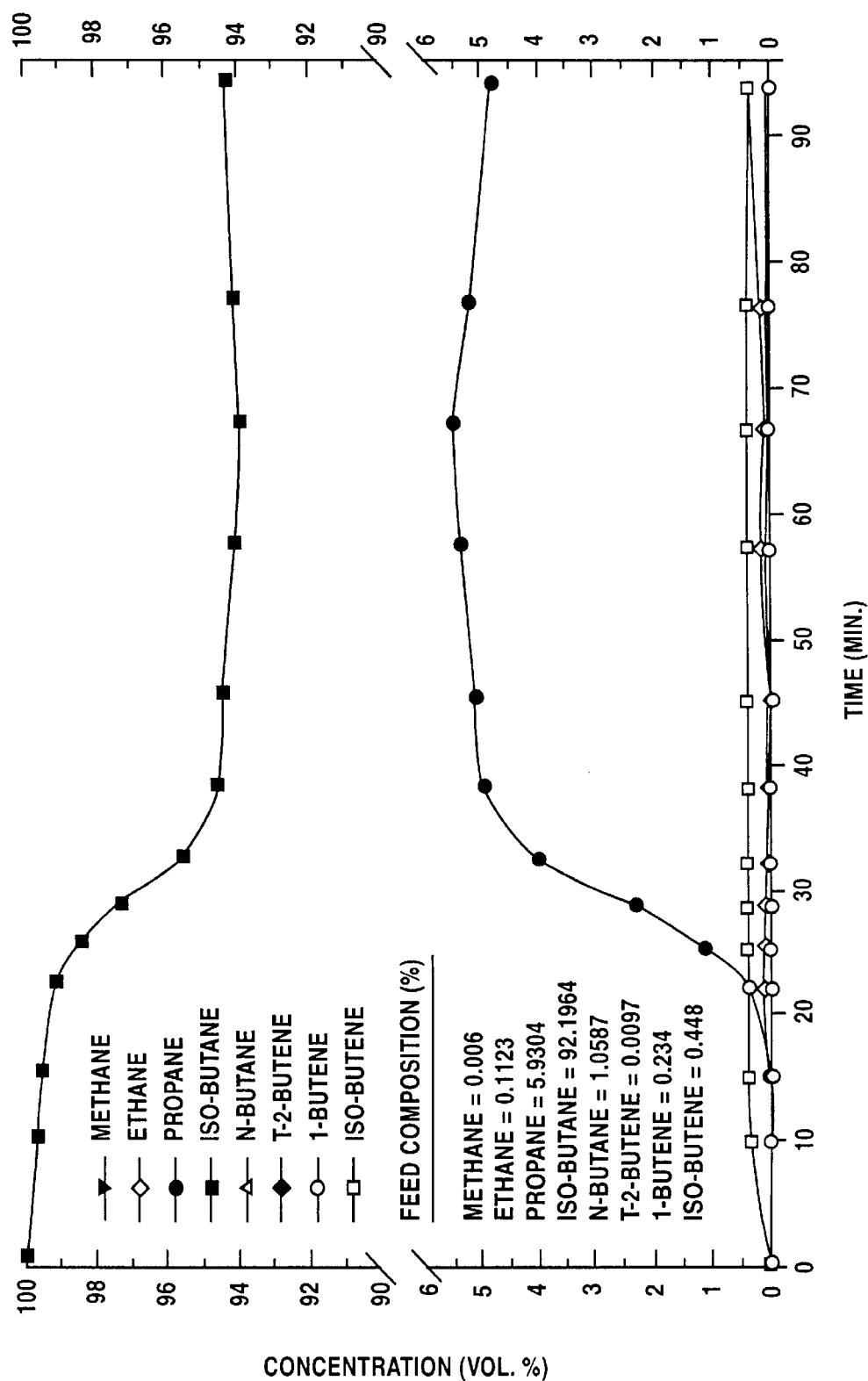
FIG. 2 is a diagram for breakthrough compositions of gas mixture containing isobutane through the fixed bed packed with zeolite 5A.

FIG. 2 shows breakthrough compositions of the mixed gas containing isobutane passing through the fixed bed packed with zeolite 5A. When the gas containing methane, ethane, propane, normal butane, isobutane, isobutene, 1-butene, and 2-butene is passed through the bed, methane, ethane, normal butane, 1-butene, and trans-2-butene are easily adsorbed on the zeolite 5A, and isobutane and isobutene come out because those can't easily penetrate the micropore of zeolite 5A. Hence, high purity isobutane cannot be obtained with only zeolite 5A adsorbent.

Figure 3:
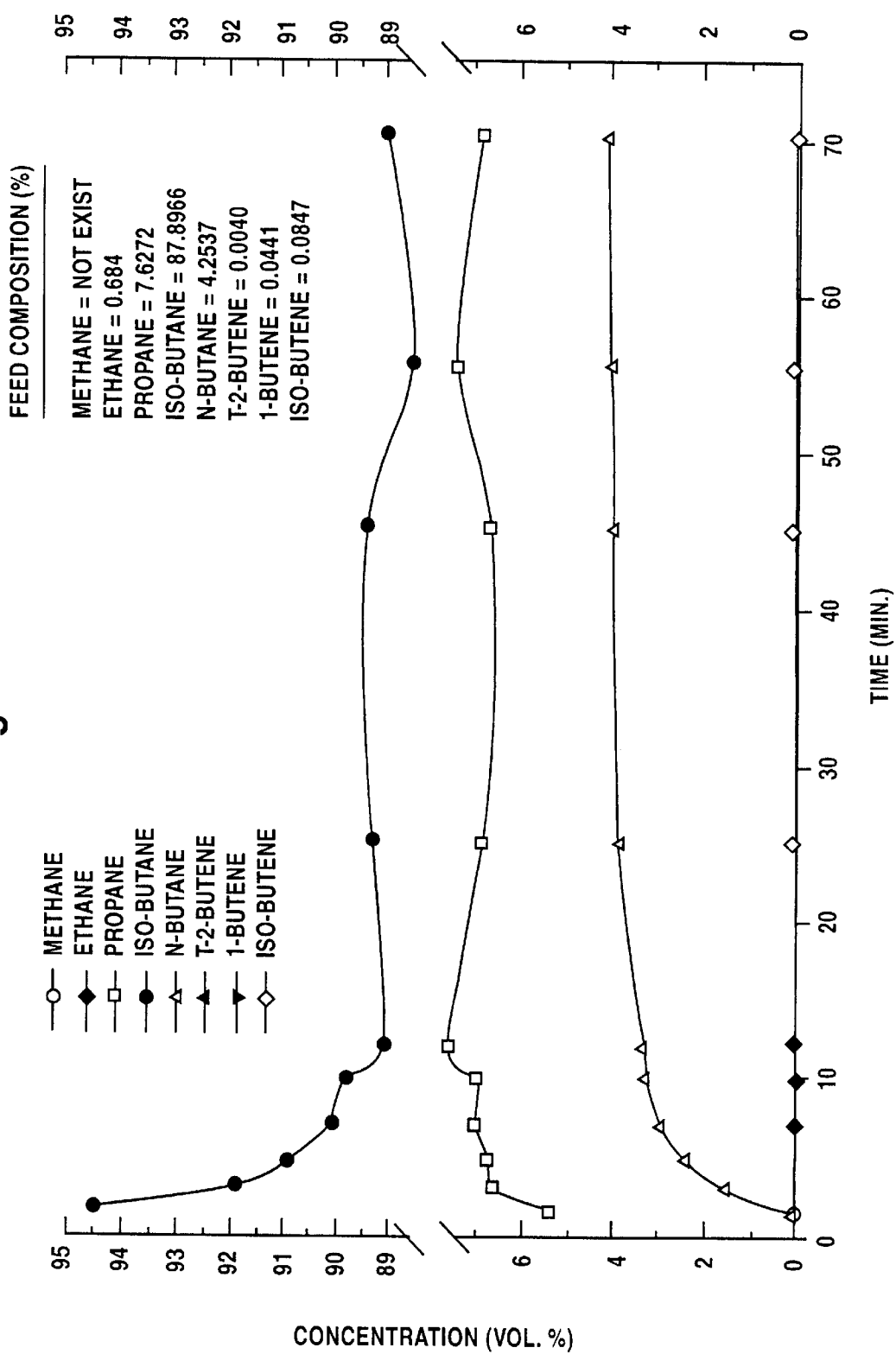
FIG. 3 is a diagram for breakthrough compositions of the gas mixture containing isobutane through the bed packed with carbon molecular sieve.

FIG. 3 shows breakthrough compositions of the mixed gas containing isobutane passing through the fixed bed packed with carbon molecular sieve adsorbent. When the gas is passed through the bed, components such as isobutene, 1-butene and 2-butene are certainly adsorbed on the adsorbent and these components do not come out during a certain time. On the other hand, the main paraffins, i.e., propane and normal butane of which adsorbed amount is relatively small, come out with isobutane.

FIG. 4 shows breakthrough compositions of the mixed gas containing isobutane passing through the bed packed with zeolite 5A and carbon molecular sieve together. When the mixed gas is passed through the multilayer bed made up of zeolite 5A and carbon molecular sieve, paraffins such as propane and normal butane and olefins such as isobutene, 1-butene, and 2-butene are fully adsorbed and high purity isobutane is obtained during a certain period.

The following are detailed explanations of the present invention with examples. The following examples are only for explanation and better understanding of the present invention and they are not intended to limit the scope of the present invention.

EXAMPLE 1

Experimental Conditions

Temperature: room temperature about 30° C.
Adsorption pressure: 740~830 mmHg
Desorption pressure: 35~50 mmHg Experimental Results Over 99.997% of isobutane is produced from a mixed gas(propane 1.27%, isobutane 92.03%, normal butane 6.5%, 2-butene 60 ppm, 1-butene 514 ppm, and isobutene 514 ppm) using two adsorption beds(height 100 cm, diameter 2.54 cm) packed with zeolite 5A(60 vol.%) and carbon molecular sieve(40 vol.%). The flow rate of the mixed gas was fixed at 3.0 l/min. (Impurity is only isobutene.)

EXAMPLE 2

Experimental Conditions

Temperature : room temperature about 30° C.
Adsorption pressure : 745~840 mmHg
Desorption pressure : 32~50 mmHg Experimental Results Over 99.991% of isobutane is produced from the mixed gas, of which the composition is 66 ppm of ethane, 4.67% of propane, 90.25% of isobutane, 4.93% of normal butane, 46 ppm of t-2-butene, 463 ppm of 1-butene, and 905 ppm of isobutene, using the two adsorption beds(height 100 cm, diameter 2.54 cm) packed with zeolite 5A(60 vol.%) and carbon molecular sieve(40 vol.%). The flow rate of the mixed gas was 3.0 l/min.

Effect of the Present Invention

In the present invention, high purity isobutane can be obtained from a mixed gas composed of paraffins such as methane, ethane, propane, isobutane and normal butane, and olefins such as t-2-butene, 1-butene, and isobutene using adsorption beds packed with zeolite 5A and carbon molecular sieve. Also, high purity isobutane can be obtained using an adsorption process combining a zeolite 5A packed bed and a carbon molecular sieve packed bed arranged in series.

We claim:

1. An adsorptive separation and isobutane purification process comprising
   (a) an adsorption step in which an isobutane-containing gas is supplied to one of at least two adsorption beds and purified isobutane emerging from the one of said at least two adsorption beds is transferred to a surge tank;
   (b) a first pressure equalization step in which the pressure of the one of said at least two adsorption beds which has undergone said adsorption step is adjusted to equal the pressure in another of said at least two adsorption beds;
   (c) a desorption step with a vacuum pump to regenerate an adsorption bed which has undergone said adsorption and said first pressure equalization steps;
   (d) a low pressure purge step to remove impurities from the bulk space of an adsorption bed which has undergone said desorption step including flowing in a counter-current direction a portion of purified isobutane while said vacuum pump is running;
   (e) a second pressure equalization step in which the pressure in one of said at least two adsorption beds which has undergone said low pressure purge step and the pressure in another of said at least two adsorption beds which has undergone said adsorption step are adjusted to be equal; and
   (f) a pressurization step in which a portion of the purified isobutane stored in said surge tank is transferred to at least one of said two adsorption beds which has undergone said low pressure purge and said second pressure equalization steps.

2. A high purity isobutane adsorption separation and purification apparatus comprising:
   (a) a pressure regulator which regulates the pressure of an isobutane-containing gas;
   (b) at least one adsorption bed packed with zeolite 5A and carbon molecular sieve arranged downstream of and operatively associated with said pressure regulator;
   (c) a flow control valve disposed between said pressure regulator and said at least one adsorption bed;
   (d) a surge tank operatively associated with and for receiving a purified isobutane product from said at least one adsorption bed;
   (e) a vacuum pump operatively associated with and for removal of impurities from said at least one adsorption bed; and
   (f) valves disposed between said pressure regulator and said at least one adsorption bed, between said at least one adsorption bed and said surge tank, and between said at least one adsorption bed and said vacuum pump.

3. A high purity isobutane adsorption-separation and purification apparatus according to claim 2, wherein said at least one adsorption bed comprises at least two beds.

4. A high purity isobutane adsorption-separation and purification apparatus according to claim 3, including valves disposed between each of said at least two beds.

5. A high purity isobutane adsorption separation and purification apparatus comprising:
   (a) a pressure regulator which regulates the pressure of an isobutane-containing gas;
   (b) at least two adsorption beds arranged in series and alternately packed with zeolite 5A and carbon molecular sieve arranged downstream of and operatively associated with said pressure regulator;
   (c) a flow control valve disposed between said pressure regulator and said at least two adsorption beds;
   (d) a surge tank operatively associated with and for receiving a purified isobutane product from said at least two adsorption beds;
   (e) a vacuum pump operatively associated with and for removal of impurities from said at least two adsorption beds; and
   (f) valves disposed between said pressure regulator and said at least two adsorption beds, between said at least two adsorption beds and said surge tank, and between said at least two adsorption beds and said vacuum pump.

6. A high purity isobutane adsorption-separation and purification apparatus according to claim 5, including valves disposed between each of said at least two beds.

* * * * *